United States Patent
Tatsutomi et al.

[15] 3,645,092
[45] Feb. 29, 1972

[54] TEMPERATURE COMPENSATING CONNECTION BETWEEN EXHAUST PURIFIER AND PIPE

[72] Inventors: Yasuo Tatsutomi; Yoshihiro Kajihara, both of Hiroshima, Japan

[73] Assignee: Toyo Kogyo Co., Ltd., Hiroshima, Japan

[22] Filed: Apr. 1, 1970

[21] Appl. No.: 24,572

[30] Foreign Application Priority Data

Apr. 4, 1969 Japan..................................44/30927
Jan. 14, 1970 Japan..................................45/4735

[52] U.S. Cl...............................60/29, 285/47, 285/187
[51] Int. Cl.............................F16l 21/00, F02b 75/10
[58] Field of Search..............................60/29; 285/47, 187

[56] References Cited

UNITED STATES PATENTS

| 2,775,470 | 12/1956 | Bixler et al. | 60/29 X |
| 2,125,703 | 8/1938 | Williams | 285/47 X |
| 3,068,026 | 12/1962 | McKamey | 285/47 |

FOREIGN PATENTS OR APPLICATIONS

| 963,612 | 1/1950 | France | 60/29 |

Primary Examiner—Benjamin W. Wyche
Attorney—Sughrue, Rothwell, Mion, Zinn & Macpeak

[57] ABSTRACT

A reactor outlet pipe connecting a reaction chamber and an exhaust pipe, that is of a multilayer construction comprising an inner wall and an outer wall which surrounds the outside of the inner wall and defines a heat insulation chamber therebetween. At least one end of the inner wall is slidable in the axial direction of the outlet pipe, so as to compensate for the difference in thermal expansion of the inner and outer walls.

5 Claims, 3 Drawing Figures

Patented Feb. 29, 1972 3,645,092

INVENTORS
YASUO TATAUTOMI
YOSHIHIRO KAJIHARA

BY Sughrue, Rothwell, Mion, Zinn & Macpeak

ATTORNEYS 3,645,092

TEMPERATURE COMPENSATING CONNECTION BETWEEN EXHAUST PURIFIER AND PIPE

BACKGROUND OF THE INVENTION

This invention relates to a constructional improvement of a reactor outlet pipe connecting to an exhaust pipe a reaction chamber of a reactor used for purifying exhaust gas.

Such a reactor is known in general as a device which effects combustion of and thus renders harmless the unburned harmful composites in the exhaust gas emitted from an engine. This type of reactor, which prevents the high temperature of the exhaust gas from radiating to the exterior thereof in order to maintain exhaust gas coming out of the engine at a high temperature so as to burn the remaining unburned composites or prevent the temperature of the engineroom from building up, should desirably be of a multilayer construction. The inner shell which forms the reaction chamber of the reactor is surrounded by an outer shell which defines a heat insulation chamber therebetween. Consequently, there develops a difference in thermal expansion of the inner and outer shells, and so if the ends of the two shells are rigidly fixed, their end portions tend to separate from their mountings or the two shells are apt to crack.

With reference to a reactor outlet pipe which leads exhaust gas coming out of the reactor to the exhaust pipe equipped with a silencer, it is desirable to provide a multilayer construction consisting of an inner wall and an outer wall surrounding the outside of the inner wall and defining a heat insulation chamber therebetween to thus prevent high temperature radiation to the exterior thereof. An outlet pipe of such a multilayer construction, as in the case of the aforementioned reactor, tends to have the fixed ends separate from their mountings, or the inner and outer walls develop cracks due to a difference in thermal expansion of the two walls.

SUMMARY OF THE INVENTION

Accordingly, it is an object of this invention to provide a reactor outlet pipe of a multilayer construction without the aforementioned disadvantages.

It is another object of this invention to provide a reactor outlet pipe of a multilayer construction that is so constructed to compensate for the difference in thermal expansion between an inner wall which forms the passage for exhaust gas and an outer wall which surrounds the outside of the inner wall and defines a heat insulation chamber therebetween.

It is another object of this invention to provide a reactor outlet pipe of a multilayer construction wherein at least one end of an inner wall is slidably supported so as to be movable in an axial direction relative to an outer wall, thereby to compensate for a difference in thermal expansion of the inner and outer walls.

It is another object of this invention to provide a reactor outlet pipe of a multilayer construction wherein an inner wall, which is movable in relation to an outer wall, supports a reactor inner shell which is movable in relation to an outer shell to ensure that exhaust gas in the reaction chamber is led to the exhaust pipe without leaking due to a differential thermal expansion.

DESCRIPTION OF THE PREFERRED EMBODIMENTS

Figure 1:
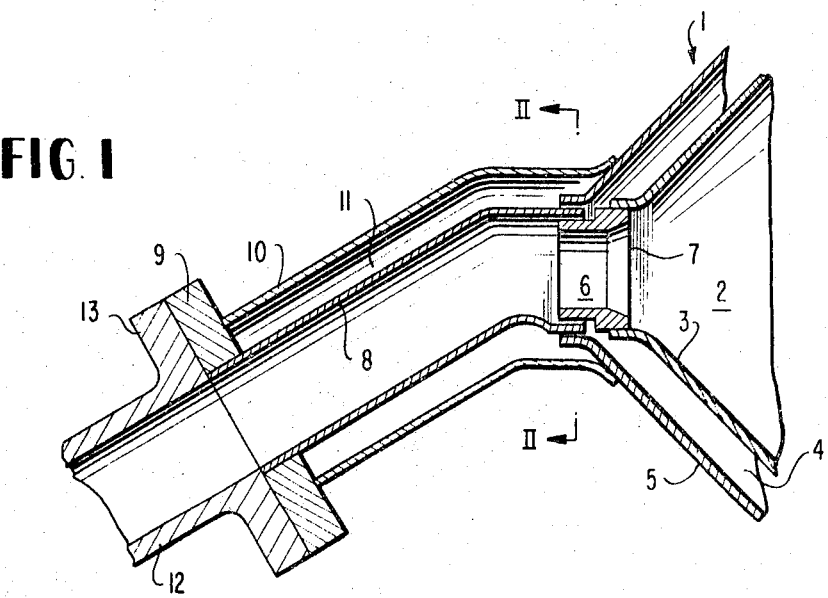
FIG. 1 is a sectional, side elevational view of a preferred embodiment of a reactor outlet pipe constructed in accordance with this invention.
Figure 2:
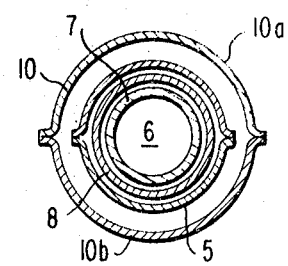
FIG. 2 is a sectional view taken along line II—II in FIG. 1.

In describing the specific embodiment of the invention by FIG. 1 and FIG. 2, a portion of a reactor 1 comprises an inner shell 3 which forms a reaction chamber 2, and an outer shell 5 which surrounds the outside of inner shell 3 and is spaced therefrom to form a heat insulation chamber 4. Reactor 1 has an inlet (not shown) to lead exhaust gas from an engine (not shown) through outer shell 5 into the reaction chamber 2 formed by inner shell 3.

Fixed to one end of inner shell 3 is a bearing member 7 which forms a passage 6, bearing member 7 being axially slidable within the inner end of an inner wall 8 of the outlet pipe which forms the passage for exhaust gas. The other end (not shown) of inner shell 3 is supported by outer shell 5, and consequently inner shell 3, when expanded by heat, is movable to the left as shown in FIG. 1 to cause bearing member 7 to slide within inner wall 8. The inner end of inner wall 8 is axially slidable on the circumference thereof within outer shell 5, so that inner wall 8 is able to move on both outer shell 5 and bearing member 7.

The outer end of inner wall 8 is fixed to a flange 9, as is the corresponding end of an outer wall 10 which surrounds the outside of inner wall 8. The other end of the outer wall 10 is fixed to outer shell 5 of reactor 1 and thus a heat insulation chamber 11 is formed between inner wall 8 and outer wall 10. As shown in FIG. 2, outer wall 10 can be easily formed by bonding the axially extending bent portions of two generally semicircular members 10a, 10b.

Flange 9 is connected to a flange 13 of exhaust pipe 12, so that exhaust gas in reaction chamber 2 flows through passage 6 of bearing member 7, through inner wall 8 and then into exhaust pipe 12. As inner wall 8 is heat insulated by heat insulation chamber 11, exhaust gas is prevented from radiating its high temperature to the outside. Outer wall 10 of the outlet pipe does not become as hot as inner wall 8 and different temperatures of the two walls result in a difference in thermal expansion thereof. However, since inner wall 8 is slidably supported at its inner end and is free to expand without restraint, no thermal stress is created. Likewise, inner shell 3 of the reactor can freely expand without thermal stress, owing to the movement of the bearing 7 within inner wall 8.

It is to be understood that bearing member 7 may be eliminated in this embodiment, with the end of inner shell 3 being slidable on the inner wall 8; or the bearing member 7 may extend over the exterior of the inner end of inner wall 8, without departing from the spirit or scope of the invention.

Figure 3:
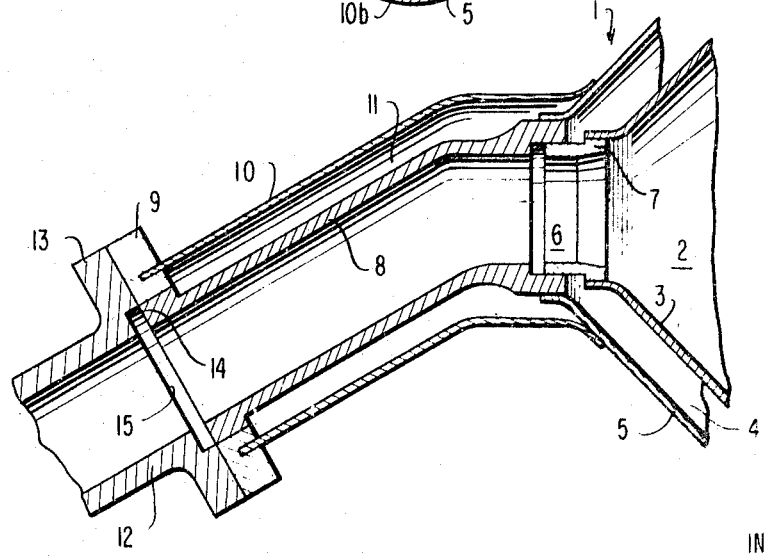
FIG. 3 is a view corresponding to FIG. 1, showing a modified reactor outlet pipe.

Referring to a modification illustrated in FIG. 3, the same numerals as in FIG. 1 indicate the same portions. In this modification, inner wall 8 of the outlet pipe preferably is made of cast iron, the inner end of which is rigidly fixed to outer shell 5 of reactor 1. The inner end of inner wall 8 slidably supports the bearing member 7 fixed to inner shell 3 and having passage 6. The outer end of inner wall 8 is slidably fitted into opening 14 defined by the flange 9 and the exhaust pipe 12. Around the inner wall 8, there is provided an outer wall 10 defining a heat insulation chamber 11 therebetween, the end of outer wall 10 being rigidly fixed to flange 9 and outer shell 5 as in the embodiment illustrated in FIG. 1. A flange 13 formed integral with or rigidly mounted on exhaust pipe 12 is secured with bolts (not shown) to flange 9. Flange 13 is recessed at a portion facing the outer end of inner wall 8 to define a portion of the opening 14 into which the inner wall 8 extends when subjected to thermal expansion.

Thus, in the modification shown in FIG. 3, exhaust gas flows from reaction chamber 2, through passage 6 formed by bearing member 7, through inner wall 8 and then into exhaust pipe 12. The difference in thermal expansion due to hot exhaust gas between inner wall 8 and outer wall 10 is compensated for by permitting inner wall 8 to slide into opening 14 of the flanges 9 and 13. Also, inner shell 3 of reactor 1 is free to thermally expand as bearing member 7 is slidably movable within inner wall 8.

As is apparent from the foregoing, this invention provides a reactor outlet pipe of multilayer construction which positively prevents damages to the outlet pipe of multilayer construction that can result from the different thermal expansion of the inner and outer walls.

This invention can also be very effectively incorporated in a reactor of a multilayer construction as the movements of the inner shell due to thermal expansion are not hampered.

We claim:

1. In combination, a reactor shell comprising an inner shell forming a reaction chamber and an outer shell surrounding the outside of said inner shell and defining a heat insulation chamber therebetween, an exhaust pipe having a flange secured thereto, a reactor outlet pipe connecting said reaction chamber to said exhaust pipe, said outlet pipe comprising an inner wall forming the passage for exhaust gas and an outer wall surrounding the outside of said inner wall and defining a heat insulation chamber therebetween, the outer end of said outer wall being rigidly fixed to said exhaust pipe flange and the inner end thereof being rigidly fixed to said outer reactor shell, and the outer end of said inner wall being rigidly fixed to said exhaust pipe flange and the inner end thereof being slidably supported by said outer shell and also slidably supporting one end of said inner shell, whereby to compensate for differences in thermal expansion between said inner wall and said outer wall and between said inner shell and said outer shell.

2. A reactor outlet pipe as defined in claim 1, wherein a bearing member having therein a passage for exhaust gas is rigidly fixed to one end of said inner shell and is slidably fitted to the inner end of said inner wall.

3. In combination, a reactor shell comprising an inner shell and an outer shell surrounding the outside of said inner shell and defining a heat insulation chamber therebetween, an exhaust pipe having a first flange thereon, a second flange secured to said first flange, a reactor outlet pipe connecting said reactor shell to said exhaust pipe, said outlet pipe comprising an inner wall forming the passage for exhaust gas and an outer wall surrounding the outside of said inner wall and defining a heat insulation chamber therebetween, the outer end of said outer wall being rigidly fixed to said second flange and the inner end thereof being rigidly fixed to said outer reactor shell, and the outer end of said inner wall being slidably supported by said second flange and the inner end thereof being rigidly fixed to said outer shell and slidably supporting one end of said inner shell, whereby to compensate for differences in thermal expansion between said inner wall and said outer wall and between said inner shell and said outer shell.

4. A reactor outlet pipe as defined in claim 3, wherein said second flange has an opening in which the outer end of said inner wall is slidably fitted, and said first flange has a recess corresponding in size and shape to said opening.

5. A reactor outlet pipe as defined in claim 4, wherein a bearing member having therein a passage for exhaust gas is rigidly fixed to said inner shell, said bearing member being slidably supported by the inner end of said inner wall.

* * * * *